United States Patent
Dow et al.

(10) Patent No.: US 10,229,658 B2
(45) Date of Patent: *Mar. 12, 2019

(54) FINGERPRINT DIRECTED SCREEN ORIENTATION

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Tynan J. Garrett, Poughkeepsie, NY (US); Emily M. Metruck, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 63 days.

This patent is subject to a terminal disclaimer.

(21) Appl. No.: 14/841,862

(22) Filed: Sep. 1, 2015

(65) Prior Publication Data

US 2016/0370907 A1    Dec. 22, 2016

Related U.S. Application Data

(63) Continuation of application No. 14/741,501, filed on Jun. 17, 2015.

(51) Int. Cl.
*G06F 3/041* (2006.01)
*G06K 9/46* (2006.01)
(Continued)

(52) U.S. Cl.
CPC .............. *G09G 5/38* (2013.01); *G06F 1/1692* (2013.01); *G06F 3/0414* (2013.01);
(Continued)

(58) Field of Classification Search
CPC .. G09G 5/38; G06F 1/1692; G06F 2200/1614
See application file for complete search history.

(56) References Cited

U.S. PATENT DOCUMENTS 7,289,824 B2    10/2007    Jerbi et al.
8,443,199 B2    5/2013    Kim et al.
(Continued)

FOREIGN PATENT DOCUMENTS

EP    0736836 A2    10/1996
EP    1892611 A1    2/2008
(Continued)

OTHER PUBLICATIONS

IBM, List of IBM Patents or Patent Applications Treated as Related, Appendix P, dated Feb. 27, 2016, 2 pages.
(Continued)

*Primary Examiner* — Samantha (Yuehan) Wang
(74) *Attorney, Agent, or Firm* — Jordan T. Schiller

(57) ABSTRACT

Embodiments of the present invention relate to directing orientation on a screen by determining an orientation of a user's fingerprint. A user's finger position may be determined when the user's finger is a predetermined distance from or in contact with a touch-sensitive device. The user's finger position may be compared with a finger position database. The finger position database may include known finger positions associated with a screen orientation. A match analysis may be performed to determine which known finger position most closely resembles the user's finger position. A screen orientation associated with the known finger position most closely matching the user's finger position may be selected. Once the screen orientation is selected, an image may be displayed on a screen corresponding with the selected screen orientation.

8 Claims, 4 Drawing Sheets

(51) Int. Cl.
*G06T 3/60* (2006.01)
*G09G 5/38* (2006.01)
*G06F 1/16* (2006.01)
*G06F 3/14* (2006.01)
*G06K 9/00* (2006.01)
*G06K 9/32* (2006.01)
*G06F 3/0488* (2013.01)

(52) U.S. Cl.
CPC ............ *G06F 3/0488* (2013.01); *G06F 3/14* (2013.01); *G06K 9/00013* (2013.01); *G06K 9/3208* (2013.01); *G06K 9/4652* (2013.01); *G06T 3/60* (2013.01); *G06F 2200/1614* (2013.01); *G06F 2203/04108* (2013.01); *G09G 2340/0492* (2013.01); *G09G 2354/00* (2013.01); *G09G 2360/121* (2013.01); *G09G 2370/022* (2013.01)

(56) References Cited

U.S. PATENT DOCUMENTS

| | | |
|---|---|---|
| 8,838,071 B1 | 9/2014 | Cronin |
| 2008/0048993 A1* | 2/2008 | Yano .................... G06F 1/1626 345/173 |
| 2009/0201257 A1 | 8/2009 | Saitoh et al. |
| 2012/0019562 A1* | 1/2012 | Park .................... G06F 3/0488 345/657 |
| 2012/0032979 A1* | 2/2012 | Blow .................... G06F 1/1626 345/647 |
| 2012/0056829 A1* | 3/2012 | Kasahara .............. G06F 3/0488 345/173 |
| 2013/0077836 A1 | 3/2013 | Zhou et al. |
| 2013/0265250 A1 | 10/2013 | Ishikawa et al. |
| 2014/0003683 A1 | 1/2014 | Vieta et al. |
| 2014/0092053 A1 | 4/2014 | Ng et al. |
| 2014/0253711 A1* | 9/2014 | Balch ................. G06K 9/00013 348/77 |
| 2015/0146944 A1* | 5/2015 | Pi ........................ H04L 63/0861 382/124 |
| 2015/0205400 A1* | 7/2015 | Hwang .................. G06F 3/044 345/654 |

FOREIGN PATENT DOCUMENTS

| | | |
|---|---|---|
| EP | 2634719 A2 | 9/2013 |
| JP | 2013235488 A | 11/2013 |

OTHER PUBLICATIONS

Pending U.S. Appl. No. 14/741,501, filed Jun. 17, 2015, Entitled:"Fingerprint Directed Screen Orientation".
Cheng et al., "iRotate Grasp: Automatic Screen Rotation based on Grasp of Mobile Devices." Proceedings of the SIGCHI Conference on Human Factors in Computing Systems. ACM, 2013, pp. 1-2.
Pending U.S. Appl. No. 14/741,501, filed Jun. 17, 2015, entitled "Fingerprint Directed Screen Orientation", 29 pages.

* cited by examiner

200

Determine a user's finger position
204

Compare the user's finger position to a finger position database
208

Select a screen orientation associated with the known finger position most closely matching the user's finger position
216

Display an image on a screen corresponding with the selected screen orientation
220

FIG. 2

FINGERPRINT DIRECTED SCREEN ORIENTATION

BACKGROUND

The present invention relates generally to the field of computing, and more particularly to directing orientation on a computer screen by determining an orientation of a user's fingerprint.

Content may be made available on a display in one or more orientations. Conventional screen orientation systems may select a screen orientation using information gathered from motion sensors within a device.

SUMMARY

Embodiments of the present invention may disclose a method for directing orientation on a screen by determining an orientation of a user's fingerprint. A user's finger position may be determined when the user's finger is near or in contact with a touch-sensitive device. The user's finger position may be compared with a finger position database. The finger position database may include known finger positions associated with a screen orientation. A match analysis may be performed to determine which known finger position most closely resembles the user's finger position. A screen orientation associated with the known finger position most closely matching the user's finger position may be selected. Once the screen orientation is selected, an image may be displayed on a screen corresponding with the selected screen orientation.

Embodiments of the present invention may disclose a computer program product for directing orientation on a screen by determining an orientation of a user's fingerprint. A user's finger position may be determined when the user's finger is near or in contact with a touch-sensitive device. The user's finger position may be compared with a finger position database. The finger position database may include known finger positions associated with a screen orientation. A match analysis may be performed to determine which known finger position most closely resembles the user's finger position. A screen orientation associated with the known finger position most closely matching the user's finger position may be selected. Once the screen orientation is selected, an image may be displayed on a screen corresponding with the selected screen orientation.

Embodiments of the present invention may disclose a system for directing orientation on a screen by determining an orientation of a user's fingerprint. A user's finger position may be determined when the user's finger is near or in contact with a touch-sensitive device. The user's finger position may be compared with a finger position database. The finger position database may include known finger positions associated with a screen orientation. A match analysis may be performed to determine which known finger position most closely resembles the user's finger position. A screen orientation associated with the known finger position most closely matching the user's finger position may be selected. Once the screen orientation is selected, an image may be displayed on a screen corresponding with the selected screen orientation.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

FIG. 2 is a flowchart depicting operational steps of a screen orientation program, on a proxy server computer for determining screen orientation on a device, in accordance with an embodiment of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1A:
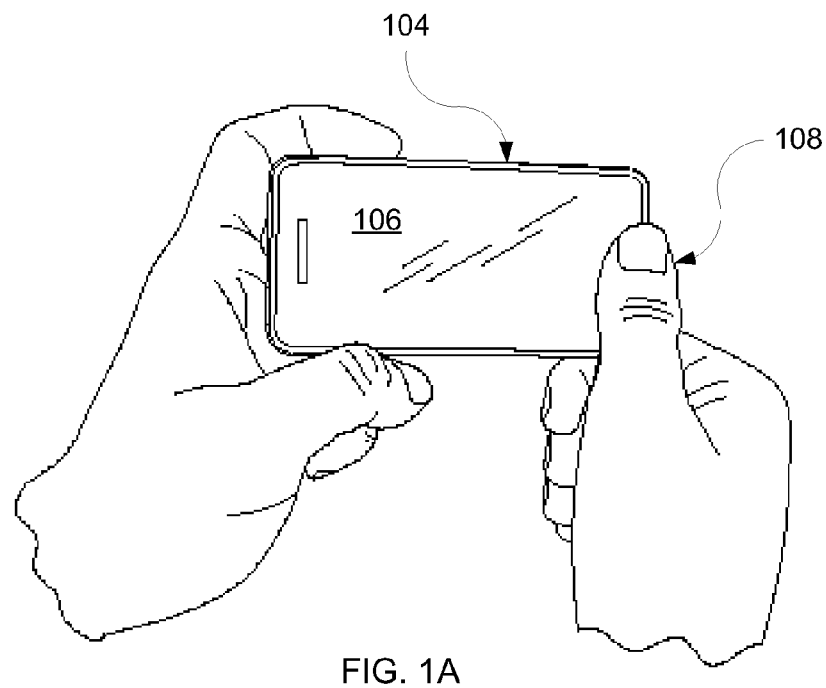
FIG. 1A depicts a user's thumb touching a mobile device in a first orientation, in accordance with an embodiment of the present invention.

Embodiments of the present invention may direct orientation on a computer screen by determining an orientation of a user's fingerprint. Conventional screen orientation systems may select a screen orientation using information gathered from motion sensors within a device. Such a conventional display system may assume that a user is in an upright position, resulting in an unfavorable screen orientation when this assumption fails. Other conventional screen orientation systems may require the user to program information, such as a fingerprint, into the device before the display system can determine an orientation. Programming information into the device may be tedious and require each new user to program his or her individualized information into the device before use of the screen orientation system.

Embodiments of the present invention may include a screen orientation system which can determine screen orientation of a device based on the device's position relative to the user's finger rather than relative to the ground or another reference point. Embodiments of the invention provide this functionality without requiring arduous initial programming or feature selection by the user. The screen orientation system may include a sensor device for detecting a user's finger position on a touch-sensitive device, which directs an orientation of a screen. A method for using the screen orientation system may involve determining a user's finger position relative to the device, comparing the user's finger position to a finger position database, selecting a screen orientation associated with a known finger position most closely matching the user's finger position, and displaying an image on a screen corresponding with the selected screen orientation. Embodiments of the present invention will now be described in detail with reference to FIGS. 1-3.

FIGS. 1A-1D depict a screen orientation system 100, according to an embodiment of the invention. In an exemplary embodiment, the screen orientation system 100 may include a user's finger position 108 on a touch-sensitive device 104 which directs an orientation of a screen 106. The screen orientation application 132 may be a program, function, or module of a computer program (not shown) executable by a processor of the screen orientation system 100, or may be embodied as one or more connected computing systems.

A user may place a finger on or near the touch-sensitive device 104. The touch-sensitive device 104 may determine a screen orientation or transmit data regarding the user's finger position 108 to another device to determine a screen orientation. Once the screen orientation is determined, an image on the screen 106 may be oriented in accordance with the screen orientation determination. Once the screen 106 has been oriented, the user may lock the screen 106 in the determined screen orientation. In an embodiment, the screen 106 may be a part of the touch-sensitive device. In another embodiment, the screen 106 may be a part of another device. For example, the screen 106 may be a part of a separate monitor, a projected image on a surface, an image displayed in glasses or goggles, or any combination thereof.

Figure 1B:
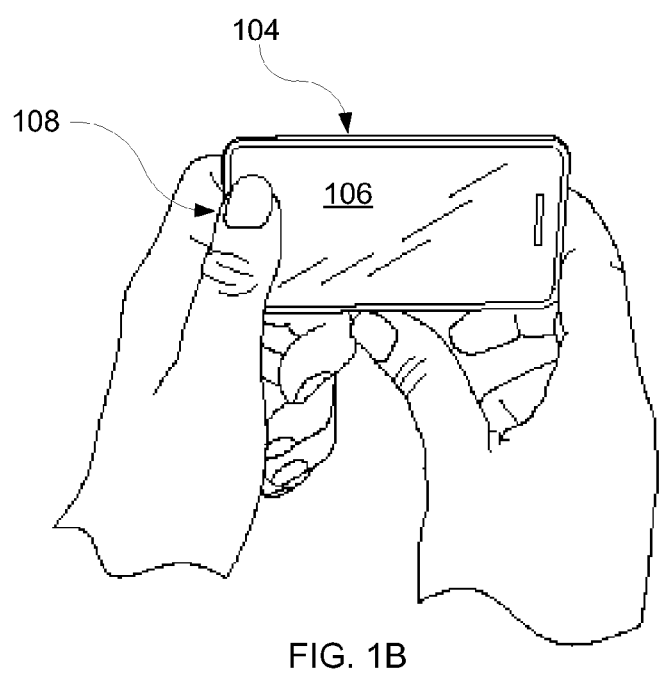
FIG. 1B depicts a user's thumb touching a mobile device in a second orientation, in accordance with an embodiment of the present invention.
Figure 1C:
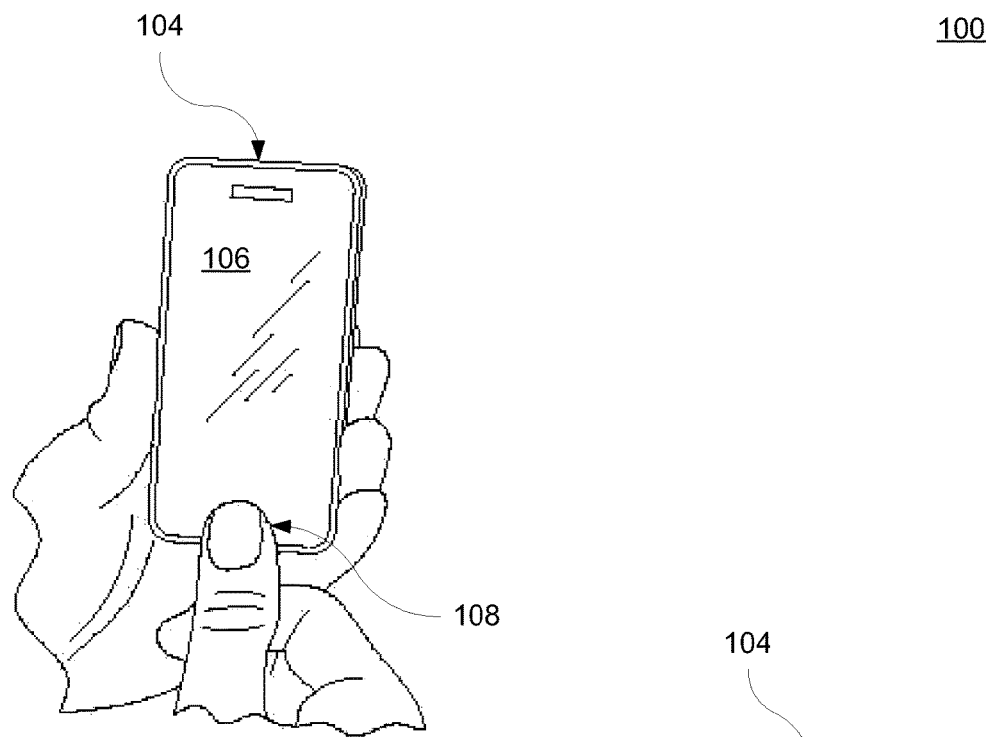
FIG. 1C depicts a user's thumb touching a mobile device in a third orientation, in accordance with an embodiment of the present invention.
Figure 1D:
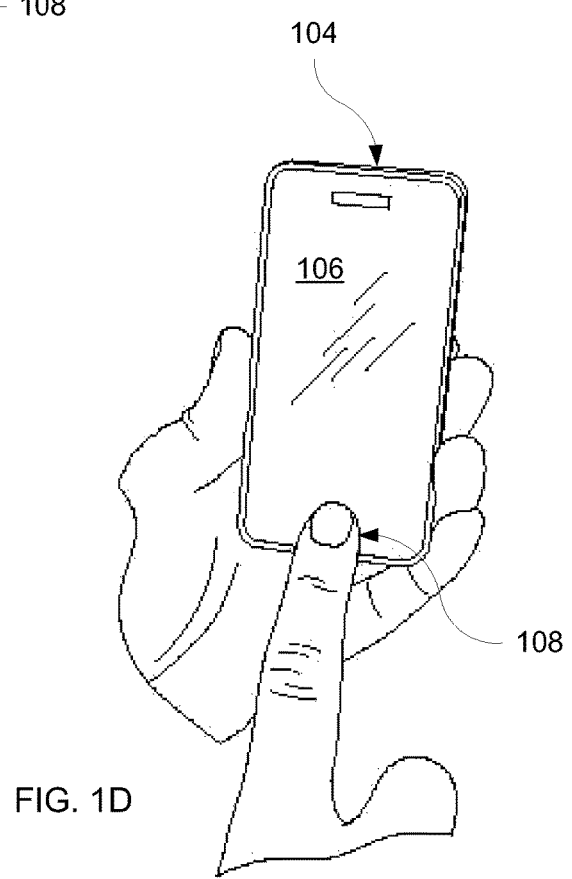
FIG. 1D depicts a user's index finger touching a mobile device in the third orientation, in accordance with an embodiment of the present invention.

The user's finger position 108 may include any finger in any orientation. For example, as depicted in FIG. 1A, a touch-sensitive device 104 may be held horizontally with a user's thumb touching the right side of the touch-sensitive device 104 with the thumb in a substantially vertical position. In another example, as depicted in FIG. 1B, a touch-sensitive device 104 may be held horizontally with a user's thumb touching the left side of the touch-sensitive device 104 with the thumb in a substantially vertical position. In another example, as depicted in FIG. 1C, a touch-sensitive device 104 may be held vertically with a user's thumb touching the bottom of the touch-sensitive device 104 with the thumb in a substantially vertical position. In another example, as depicted in FIG. 1D, a touch-sensitive device 104 may be held vertically with a user's index finger touching the bottom of the touch-sensitive device 104 with the thumb in a substantially vertical position.

The touch-sensitive device 104 may detect an impression on the touch-sensitive device 104 which may be used to determine the user's finger position 108. An impression may include, for example, a characteristic of the user's finger which may be detected by the touch-sensitive device 104. An impression may be detected from any surface of the touch-sensitive device 104 or a distance from the touch-sensitive device 104. For example, an impression may be detected on a front surface, back surface, a side surface, a bottom surface, or any combination thereof. Once the impression is detected, the touch-sensitive device 104 may analyze data gathered from the impression or transmit data gathered from the impression to another device. For example, the touch-sensitive device 104 may include one or more internal computing devices which may analyze data gathered from the impression locally. In another example, the touch-sensitive device may include one or more communication devices, such as, for example, WiFi, Bluetooth, Long-Term Evolution (LTE), or another communication device which may transmit data gathered from the impression to a separate computing device where it may be analyzed. Data gathered from the impression may be used to determine the user's finger position 108. Data collected from the impression may include, for example, a shape, pressure gradient, pattern (including a fingerprint), color, temperature profile, or any combination thereof.

The shape of an impression alone may be used to determine the user's finger position 108. When a user places a finger on the touch-sensitive device, an imperfect oval impression at the contact point between the touch-sensitive device 104 and the user's finger may be formed. The imperfect oval impression may be used to determine the user's finger position 108. The imperfect oval impression may have a length and a width, wherein the length is longer than the width. The length of the imperfect oval impression may run along a length of the user's finger. The imperfect oval impression may have a wider upper width portion and a narrower lower width portion. The wider upper width portion may be associated with an outermost portion of a fingerprint because an outermost portion of a finger may tend to leave a wider impression. The narrower lower width portion may be associated with an inner most portion of a fingerprint because an innermost portion of a finger may tend to leave a narrower impression. Thus, by examining the dimensions of the imperfect oval impression, the user's finger position 108 may be determined.

The pressure gradient of the impression alone may be used to determine the user's finger position 108. When a user places a finger on the touch-sensitive device, a region near the center of the impression may exert a larger pressure than a region near the outside of the impression. A termination point of the distal phalanges may distort the pressure gradient so that the greatest pressure may be exerted at a region of the impression closest to the termination point of the distal phalanges. By analyzing the pressure gradient exerted on the touch-sensitive device, and any distortion in the pressure gradient, the user's finger position 108 may be determined.

The pattern of the impression alone may be used to determine the user's finger position 108. Although fingerprints from different individuals may be unique, certain commonalities exist in every fingerprint which may be used to determine the user's finger position 108. For example, fingerprints very often, and perhaps always, arch downwards near an end of a finger. This downward arching pattern near an end of a finger may be used to determine the user's finger position 108. Patterns on the user's finger may be detect while the user's finger is in contact with the touch-sensitive device 104 or at a distance. For instance, the user may hover a finger a distance from the touch-sensitive device 104 which may be detected by a camera or similar device to detect patterns on the user's finger.

The color of the impression alone may be used to determine the user's finger position 108. When a user places a finger on the touch-sensitive device 104, the pressure from the touch may change the color of the finger. The end of a user's finger may have a reddish hue which may become a lighter hue when the user's finger comes into contact with the touch-sensitive device 104. Color change of skin when a pressure is applied may be referred to as blanching. Blanching may be the result of reduced blood flow to the region where pressure is applied. In an embodiment, the touch-sensitive device 104 may detect a color gradient of the impression similar to the pressure gradient of the impression discussed above. In another embodiment, the touch-sensitive device 104 may detect a shape of the color change of the finger similar to detecting the shape of the impression discussed above.

The temperature profile alone may be used to determine the user's finger position 108. When a user places a finger on the touch-sensitive device 104, the temperature of the finger may be detected by one or more temperature sensors (not shown). The temperature sensors may include, for example, a thermistor or other temperature sensing device. The temperature profile of the user's finger may include the shape of a thermal impression on the surface of a touch-sensitive device, a thermal gradient of an impression on the surface of a touch-sensitive device, a thermal gradient of the user's finger a distance from the touch-sensitive device, or any combination thereof. When a user touches a surface of the touch-sensitive device, a higher temperature region may be detected. In an embodiment, the higher temperature region may indicate the shape of the user's finger. As discussed above, the shape of the user's finger may be used to determine the user's finger position. In another embodiment, a thermal gradient of the impression may be used to determine the user's finger position. The thermal gradient may include a center region having a greater temperature and an outer region may have a lesser temperature. A termination point of the distal phalanges may distort the thermal gradient so that the greatest temperature may be exist at a region of the impression closest to the termination point of the distal phalanges. By analyzing the thermal gradient on the touch-sensitive device, and any distortion in the thermal gradient, the user's finger position 108 may be determined.

In an embodiment, the shape of the impression alone may be used to determine the user's finger position 108. In another embodiment, the pressure gradient of the impression alone may be used to determine the user's finger position 108. In an embodiment, the pattern of the finger alone may be used to determine the user's finger position 108. In an embodiment, the color of the impression alone may be used to determine the user's finger position 108. In an embodiment, the shape of the impression, the pressure gradient of the impression, the pattern of the finger, the color of the impression, or any combination thereof may be used to determine the user's finger position 108.

The screen 106 may be a part of the touch-sensitive device 104 or located on a separate device. For example, in FIGS. 1A-1D, the screen 106 is depicted as part of the touch-sensitive device 104 where the screen 106 may be the surface touched by the user. In another example, the screen 106 may be part of a separate device so that the user may use the touch-sensitive device 104 to determine an orientation of the screen 106 on the separate device.

Figure 3:
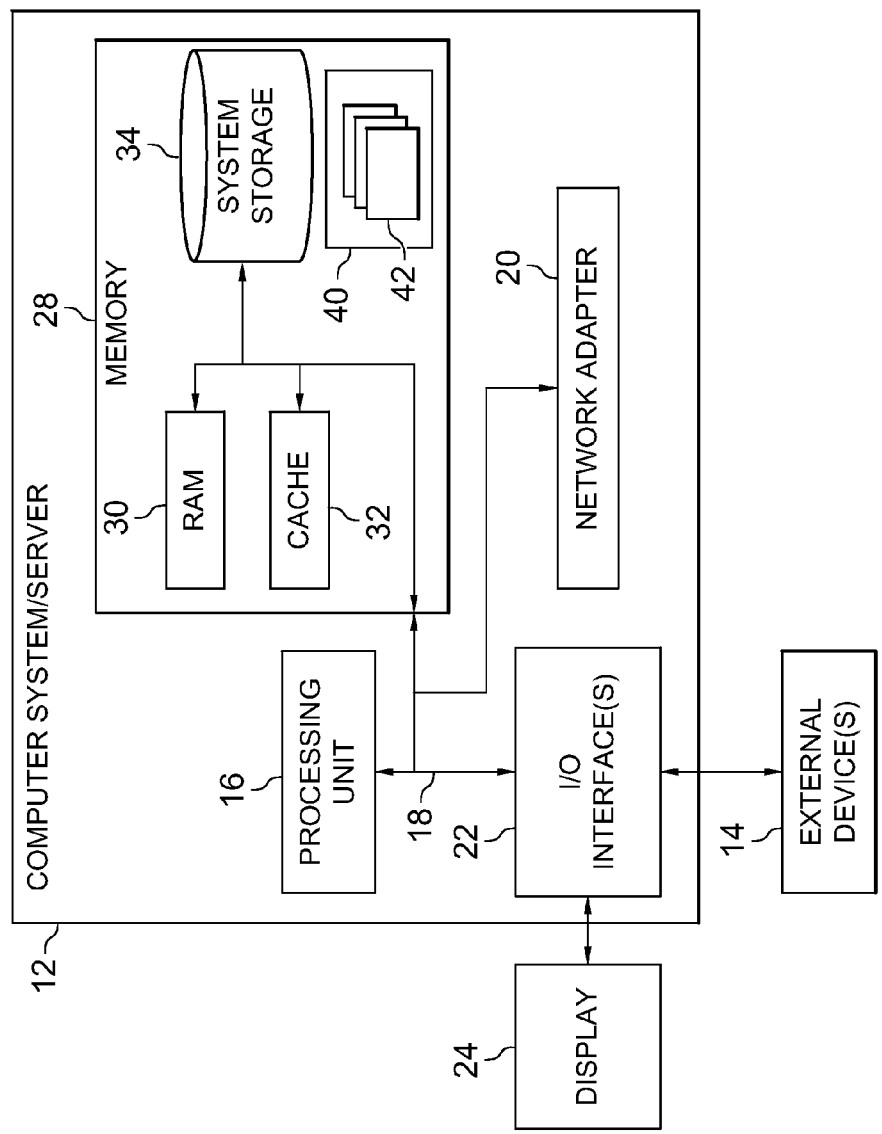
FIG. 3 depicts a block diagram of components of the proxy server computer executing the screen orientation program, in accordance with an embodiment of the present invention.

Screen orientation system 100 may be implemented using a computing node such as the computing node of FIG. 3. In an embodiment, the computing node described in FIG. 3 may be a computing node.

Computing device 104 may be a laptop computer, tablet computer, netbook computer, personal computer (PC), desktop computer, smart phone, or any programmable electronic device. Computing device 104 may include internal and external hardware components, as depicted and described in further detail with respect to FIG. 3. Computing device 104 includes a screen orientation application 132.

FIG. 2 is a flowchart of a method 200 for directing screen orientation, using the screen orientation system 100 of FIG. 1, in accordance with an embodiment of the present invention. Steps of method 200 may be executed using a processor of a computer that encompasses, or is part of, screen orientation system 100, or another system. In an embodiment, a method of directing screen orientation may involve determining a user's finger position 204 (hereinafter "determining step"), comparing the user's finger position to a finger position database 208 (hereinafter "comparing step"), selecting a screen orientation associated with the known finger position most closely matching the user's finger position 216 (hereinafter "selecting step"), and displaying an image on a screen corresponding with the selected screen orientation 220 (hereinafter "displaying step").

The determining step 204 of method 200 may be performed by gathering data from the user's finger on the touch-sensitive device 104 and analyzing the data. Data gathered from the user's finger may be analyzed through a processor within the touch-sensitive device 104 or transmitted to and analyzed within another device. In an embodiment, as discussed above, the shape of the impression, the pressure gradient of the impression, the pattern of the finger, the color of the impression, or any combination thereof may be used to determine the user's finger position 108.

The comparing step 208 may be performed by determining which known finger position in the finger position database most closely matches the data gathered from the user's finger. Data gathered from the user's finger may be compared to similar data or compared to distinct data. For example, the data gathered from the user's finger may comprise the pressure gradient of the impression left by the finger and compared to similar pressure gradient data in the finger position database. In another example, the data gathered from the user's finger may comprise the pressure gradient of the impression left by the finger which may be used to determine the shape of the impression and compared to shape data in the finger position database.

The selecting step 216 may be used to determine which screen orientation is most appropriate for the user. A screen orientation may be associated with each known finger position. Once the known finger position most closely associated with data gathered from the user's finger is identified, the screen orientation associated with the known finger position may be selected. In the event that more than one known finger position is identified in the comparing step 208, the selecting step 216 may use supplementary data such as, for example, historical finger positioning of the user, historical finger positioning of all users, motion sensor data, or any combination thereof. Utilization of supplemental data may occur during the comparing step 208 or the selecting step 216.

The displaying step 220 may display an image on a screen corresponding with the selected screen orientation from the selecting step 216. The image may be reoriented by the display device to correspond with the selected screen orientation, and then transmitted to a screen to be displayed for a user.

Referring now to FIG. 3, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for displaying a screen orientation, the method comprising:
   detecting, by a computer, an impression of a user's finger in contact with a non-edge surface of a touch-sensitive device;
   determining, by the computer, an orientation of the impression of the user's finger;
   comparing, by the computer, the orientation of the impression of the user's finger with a finger impression orientation database, the finger impression orientation database comprising known finger impression orientations associated with a screen orientation display, wherein a match analysis is performed to determine which known finger impression orientation most closely resembles the orientation of the impression of the user's finger in contact with the non-edge surface of the touch-sensitive device;
   selecting, by the computer, the screen orientation display associated with the known finger impression orientation that most closely resembles the orientation of the impression of the user's finger in contact with the non-edge surface of the touch-sensitive device; and
   displaying an image on the touch-sensitive device corresponding with the selected screen orientation display.

2. The method of claim 1, wherein determining the orientation of the impression of the user's finger comprises analyzing a shape of the impression of the user's finger in contact with the non-edge surface of the touch-sensitive device.

3. The method of claim 1, wherein determining the orientation of the impression of the user's finger comprises analyzing a pressure gradient of the impression of the user's finger in contact with the non-edge surface of the touch-sensitive device.

4. The method of claim 1, wherein determining the orientation of the impression of the user's finger comprises analyzing a captured fingerprint of the impression of the user's finger based on common fingerprint patterns.

5. The method of claim 1, wherein determining the orientation of the impression of the user's finger comprises analyzing one or more captured colors of one or more areas of the impression of the user's finger.

6. The method of claim 1, wherein determining the orientation of the impression of the user's finger comprises analyzing a captured temperature of one or more areas of the impression of the user's finger.

7. The method of claim 1, wherein comparing the orientation of the impression of the user's finger with a finger impression orientation database incorporates one or more historical orientations of the impressions of the user's finger, one or more historical orientations of the impressions of one or more additional users, and motion sensor data associated with the touch-sensitive device.

8. The method of claim 1, wherein determining the orientation of the impression of the user's finger further comprises:
   detecting the orientation of the impression of the user's finger in contact with, or within a pre-defined distance from, the non-edge surface of the touch-sensitive device.

* * * * *